United States Patent [19]

Gilon et al.

[11] Patent Number: 5,684,474

[45] Date of Patent: Nov. 4, 1997

[54] COLLISION AVOIDANCE DETECTOR

[76] Inventors: Shmuel Gilon, 18/B Hazait Street, Mazkeret Batya, Israel, 76804; Robert Zelig, 1 Shlomzion Hamalka Street, Ashdod, Israel, 77728

[21] Appl. No.: 615,619

[22] Filed: Mar. 13, 1996

[30] Foreign Application Priority Data

Mar. 13, 1995 [IL] Israel ............................... 112.981

[51] Int. Cl.$^6$ .................................................. G08G 1/16
[52] U.S. Cl. ...................... 340/903; 340/463; 340/479; 340/435; 340/436; 367/909
[58] Field of Search .................................. 340/463, 464, 340/467, 479, 435, 436, 903; 367/909

[56] References Cited

U.S. PATENT DOCUMENTS

| | | | |
|---|---|---|---|
| 3,732,536 | 5/1973 | Larka et al. | 340/903 |
| 3,891,966 | 6/1975 | Sztankay | 340/903 |
| 4,626,850 | 12/1986 | Chey | 340/903 |
| 5,091,726 | 2/1992 | Shyu | 340/904 |
| 5,212,467 | 5/1993 | Park | 340/903 |

*Primary Examiner*—Jeffery Hofsass
*Assistant Examiner*—Daniel J. Wu
*Attorney, Agent, or Firm*—Helfgott & Karas, PC

[57] ABSTRACT

A collision avoidance detector including a transceiver installed in a rear portion of a leading vehicle operative to transmit a signal to and receive a reflected signal from a trailing vehicle, a processor operative to process the signals and derive therefrom information concerning a safe distance criterion between the leading and trailing vehicles and an alarm device, wherein the processor actuates the alarm device if the safe distance criterion is not met.

1 Claim, 3 Drawing Sheets

COLLISION AVOIDANCE DETECTOR

FIELD OF THE INVENTION

The present invention relates to collision avoidance detectors for vehicles generally, and particularly to those which operate by radar.

BACKGROUND OF THE INVENTION

Many types of collision avoidance detectors which operate by radar are known in the art. In general, these detectors are mounted in a front portion of a vehicle. Thus, the detector is operational only when installed in a trailing vehicle which is traveling behind another vehicle. If the distance between the vehicles is unsafe, the detector alerts the driver of the trailing vehicle and the driver presumably decelerates.

Typically the driver is alerted by an audio or visual alarm such as a buzzer or a flashing light on the dashboard.

A disadvantage of such detectors is that they are sometimes prone to false alarms so that the driver tends to ignore real alarms. More importantly, successful operation of such detectors is dependent upon the offending driver installing such a device in his vehicle and once installed, heeding the alarm. A driver who does not practice proper driving safety often does not install nor heed the alarm in his own vehicle.

SUMMARY OF THE INVENTION

The present invention seeks to provide an improved collision avoidance detector which helps to overcome the problems of the prior art. The detector is a defensive system, that is, it is installed in the vehicle which desires protection from rear collisions. The detector generally signals the offending trailing vehicle in a way which causes the offending driver to instinctively decelerate.

There is thus provided in accordance with a preferred embodiment of the present invention a collision avoidance detector including a transceiver installed in a rear portion of a leading vehicle operative to transmit a signal to and receive a reflected signal from a trailing vehicle, a processor operative to process the signals and derive therefrom information concerning a safe distance criterion between the leading and trailing vehicles, and an alarm device, wherein the processor actuates the alarm device if the safe distance criterion is not met.

In a preferred embodiment of the present invention, the alarm device includes brake lights of the leading vehicle, such that the processor causes illumination of the brake lights if the safe distance criterion is not met. Illumination of the brake lights causes the driver of the offending trailing vehicle to instinctively decelerate.

Additionally in accordance with a preferred embodiment of the present invention, the alarm device is mounted inside the leading vehicle. In this way, the driver of the leading vehicle is alerted that an object is positioned at an unsafe distance behind his vehicle. Such a system may be used to warn the driver of possible collision with objects when traveling in reverse.

There is also provided in accordance with a preferred embodiment of the present invention, a collision avoidance detector including a transceiver installed on a stationary object operative to transmit a signal to and receive a reflected signal from a vehicle, a processor operative to process the signals and derive therefrom information concerning a safe distance criterion between the stationary object and the vehicle, and an alarm device, wherein the processor actuates the alarm device if the safe distance criterion is not met.

There is further provided in accordance with a preferred embodiment of the present invention a method of collision avoidance including providing a transceiver installed in a rear portion of a leading vehicle which transmits a signal to and receives a reflected signal from a trailing vehicle, providing a processor which processes the signals and derives therefrom information concerning a safe distance criterion between the leading and trailing vehicles, and providing an alarm device, wherein the processor actuates the alarm device if the safe distance criterion is not met.

In accordance with a preferred embodiment of the present invention, the processor causes illumination of brake lights of the leading vehicle if the safe distance criterion is not met.

Additionally in accordance with a preferred embodiment of the present invention, the processor causes flashing illumination of the brake lights of the leading vehicle if a first safe distance criterion is not met, and causes continuous illumination of the brake lights of the leading vehicle if a second safe distance criterion is not met.

There is also provided in accordance with a preferred embodiment of the present invention, a method of collision avoidance including providing a transceiver installed on a stationary object which transmits a signal to and receives a reflected signal from a vehicle, providing a processor which processes the signals and derives therefrom information concerning a safe distance criterion between the stationary object and the vehicle, and providing an alarm device, wherein the processor actuates the alarm device if the safe distance criterion is not met.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
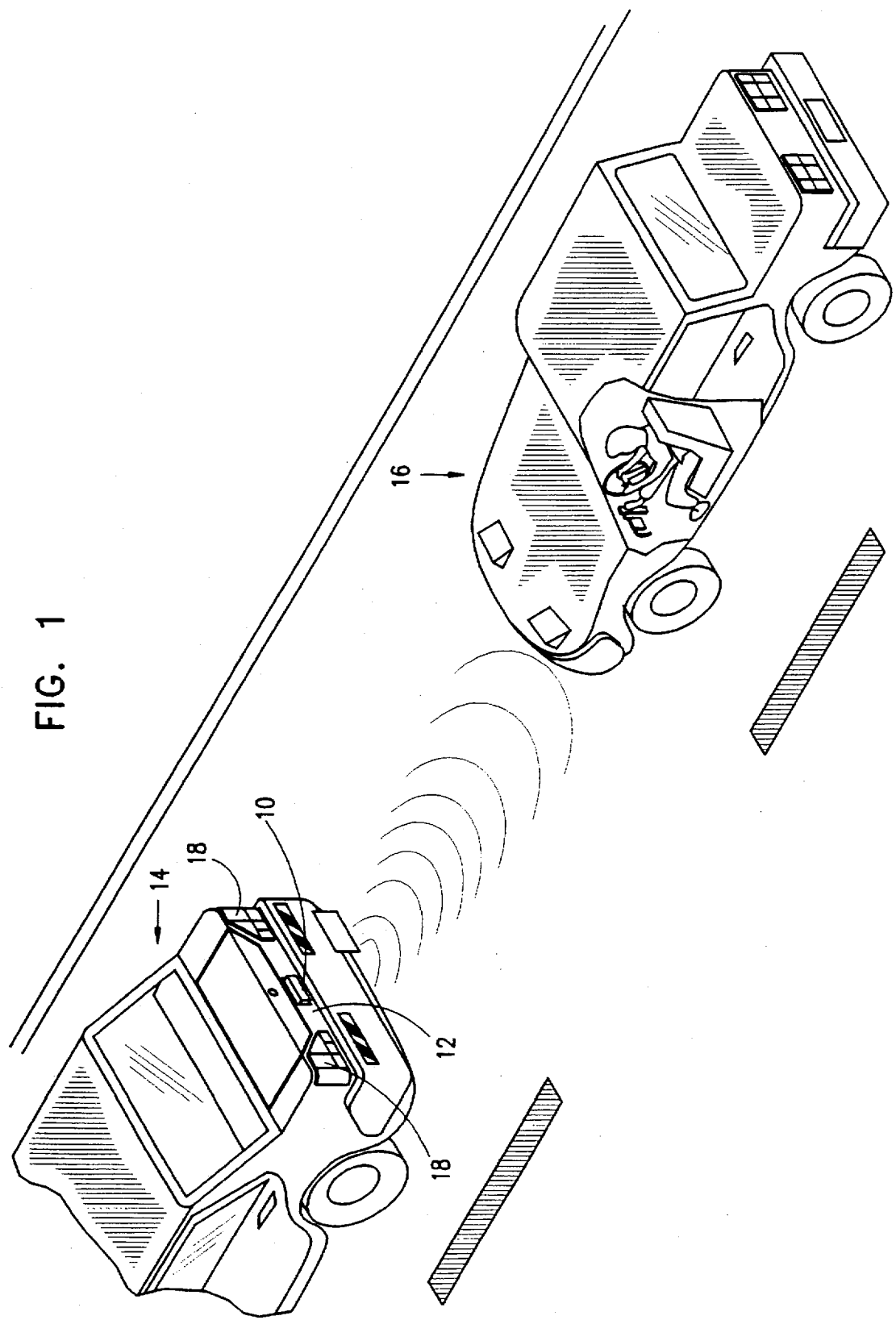
FIG. 1 is a simplified pictorial illustration of a collision avoidance detector constructed and operative in accordance with a preferred embodiment of the present invention installed in a leading vehicle, and wherein a trailing vehicle is at a safe distance.

Reference is now made to FIG. 1 which illustrates a collision avoidance detector 10 constructed and operative in accordance with a preferred embodiment of the present invention. The detector 10 is installed in a rear portion 12 of a leading vehicle 14.

The detector 10 comprises a transceiver and a processor (both not shown). The transceiver is operative to transmit signals to and receive reflected signals from a trailing vehicle 16. The transceiver may be any conventional radar transceiver of the art used in collision avoidance systems, and may operate in any suitable range of frequency. In a preferred embodiment of the present invention, the transceiver operates in a frequency range of 76–77 GHz which is the range approved by the FCC for collision avoidance devices.

The transceiver may alternatively comprise a laser, although operation is generally limited by weather and visibility conditions.

The processor may be any conventional processor of the art used in collision avoidance systems. The processor is operative to process the radar signals and derive therefrom information concerning a safe distance criterion between the leading 14 and the trailing 16 vehicles.

The safe distance criterion is derived according to one or more samplings of signal information acquired by the processor.

The safe distance criterion used by the system is a function of the difference between the velocities of the leading 14 and the trailing 16 vehicles, the absolute velocity of the leading vehicle 14 and a multiplicity of pre-programmed factors, including among others, average reaction time of a driver as a function of speed, amount of light, time of day and road conditions, average coefficient of friction between tires and road, and condition of tires and brakes.

The relative velocity of the leading vehicle 14 with respect to the trailing vehicle 16 is acquired by the transceiver. The velocity of the leading vehicle 14 may be provided by one or more speed measuring mechanisms of that vehicle. It is appreciated that suitable sensors may be provided for acquiring other pertinent data such as amount of light, time of day, weather conditions, road conditions, and condition of tires and brakes.

The safe distance criterion calculated by the processor is the distance considered by safety experts to allow the driver of the trailing vehicle 16 to safely brake and avoid a collision with the leading vehicle 14 under the current driving conditions.

The processor compares the calculated safe distance with the actual distance between the leading 14 and the trailing 16 vehicles as measured by the transceiver and the processor. As long as the measured distance is safe, no alarm is actuated. FIG. 1 illustrates a safe distance between the leading 14 and the trailing 16 vehicles.

Figure 2:
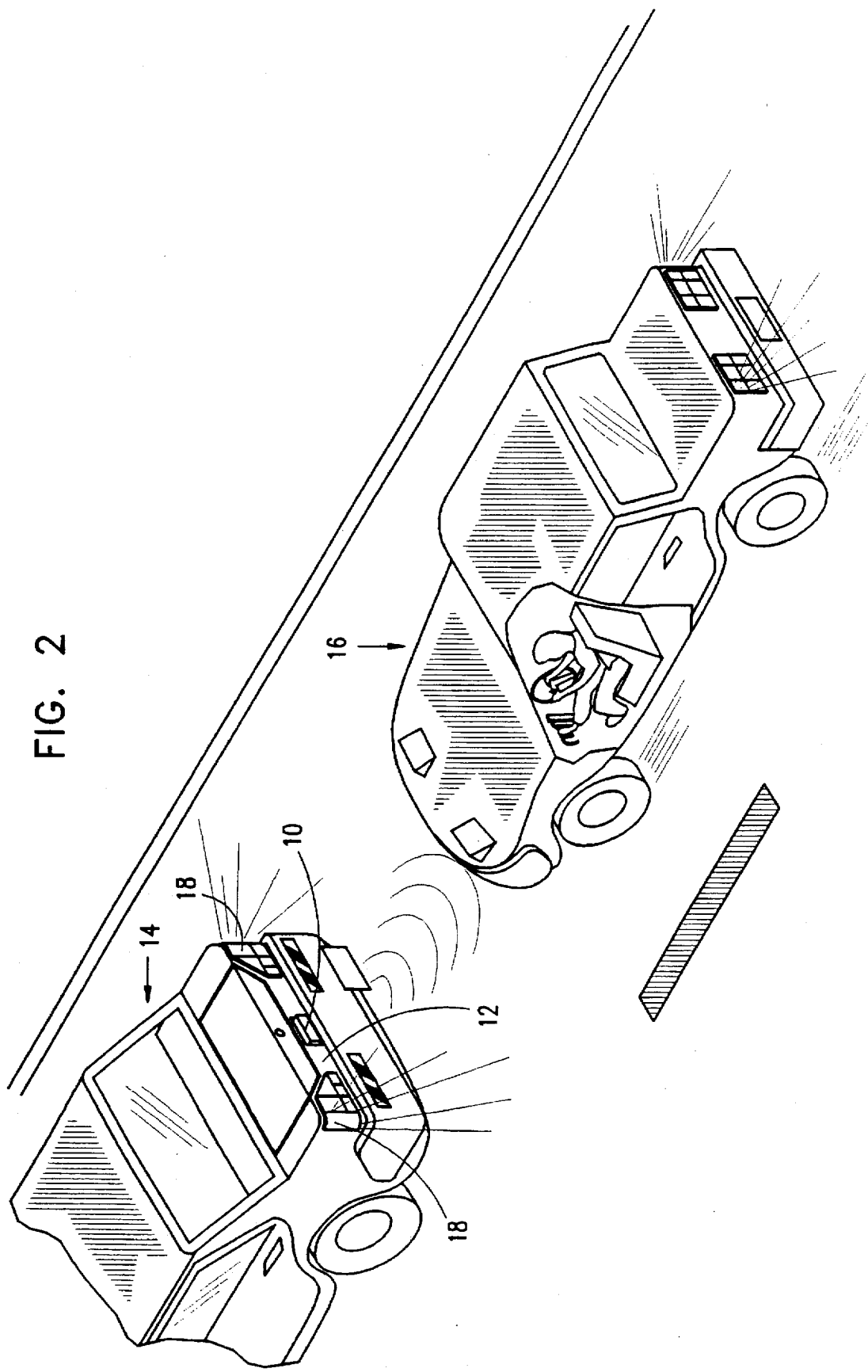
FIG. 2 is a simplified pictorial illustration of the collision avoidance detector of FIG. 1 and wherein a trailing vehicle is not at a safe distance.

If the measured distance between the two vehicles is not safe, then the processor actuates an alarm device, such as the brake lights 18 of the leading vehicle 14, as shown in FIG. 2. Illumination of the brake lights 18 causes the driver of the offending trailing vehicle 16 to instinctively depress the brake pedal and decelerate, as shown in FIG. 2.

Alternatively, in accordance with a preferred embodiment of the present invention, the processor may cause flashing illumination of the brake lights 18 of the leading vehicle 14 if a first safe distance criterion is not met, and cause continuous illumination of the brake lights 18 if a second safe distance criterion is not met. In this way, a gradual warning is issued to the offending driver of the trailing vehicle 16.

Alternatively or additionally, an alarm device may be mounted in the leading vehicle 14, and may comprise an audio or visual alarm. In this way, the driver of the leading vehicle 14 is alerted that an object is positioned at an unsafe distance behind his vehicle. Such a system may be used to warn the driver of possible collision with objects when traveling in reverse.

Figure 3:
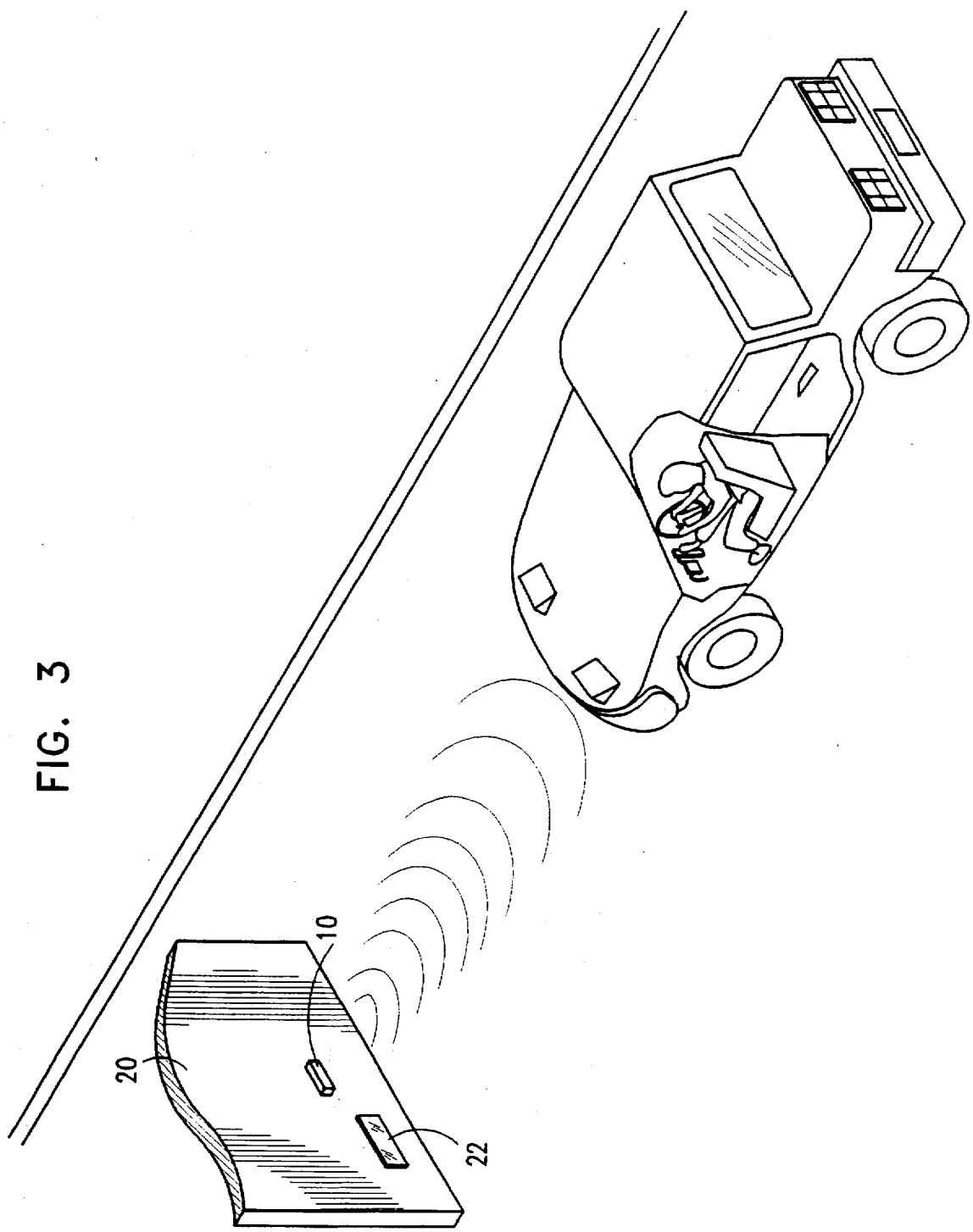
FIG. 3 is a simplified pictorial illustration of the collision avoidance detector of FIG. 1 installed on a stationary object and operative to avoid collisions between the stationary object and a vehicle.

Reference is now made to FIG. 3 which illustrates the collision avoidance detector 10 mounted on a stationary object, such as a wall 20. If the safe distance criterion is not met, the detector 10 actuates an alarm device 22, such as flashing lights or a buzzer, mounted on the wall 20. Such an arrangement may be useful in avoiding collisions, for example, in a garage or parking lot.

It will be appreciated by persons skilled in the art that the present invention is not limited by what has been particularly shown and described hereinabove. Rather the scope of the present invention is defined only by the claims which follow:

We claim:

1. A method of collision avoidance comprising:

transmitting a signal from a rear portion of a leading vehicle to a trailing vehicle;

receiving a reflected signal from said trailing vehicle;

processing said signals and deriving therefrom information concerning a safe distance criterion between said leading and trailing vehicles; and causing flashing illumination of brake lights of said leading vehicle if a first safe distance criterion is not met, and causing continuous illumination of said brake lights of said leading vehicle if a second safe distance criterion is not met.

* * * * *